(12) United States Patent
Decrop et al.

(10) Patent No.: US 11,477,285 B2
(45) Date of Patent: Oct. 18, 2022

(54) CONTEXTUAL DEVICE COMMAND RESOLUTION

(71) Applicant: International Business Machines Corporation, Armonk, NY (US)

(72) Inventors: Clement Decrop, Arlington, VA (US); John M. Ganci, Jr., Raleigh, NC (US); Sarbajit K. Rakshit, Kolkata (IN); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/195,693

(22) Filed: Mar. 9, 2021

(65) Prior Publication Data

US 2022/0293289 A1  Sep. 15, 2022

(51) Int. Cl.
| | | |
|---|---|---|
| *G06F 15/16* | (2006.01) | |
| *H04L 67/12* | (2022.01) | |
| *G16Y 40/35* | (2020.01) | |
| *G16Y 20/10* | (2020.01) | |
| *G16Y 40/20* | (2020.01) | |

(52) U.S. Cl.
CPC ............. *H04L 67/12* (2013.01); *G16Y 20/10* (2020.01); *G16Y 40/20* (2020.01); *G16Y 40/35* (2020.01)

(58) Field of Classification Search
CPC ........ G16Y 20/10; G16Y 40/35; G16Y 40/20; H04L 67/12
See application file for complete search history.

(56) References Cited

U.S. PATENT DOCUMENTS

| | | | |
|---|---|---|---|
| 9,349,368 B1 | 5/2016 | Lebeau | |
| 9,483,934 B2 | 11/2016 | Kotlicki | |
| 2015/0370272 A1 | 12/2015 | Reddy | |
| 2016/0330327 A1* | 11/2016 | Lee | ........................ H04L 12/12 |
| 2017/0006135 A1* | 1/2017 | Siebel | ..................... H04L 67/12 |
| 2019/0349213 A1 | 11/2019 | Shive | |
| 2020/0177410 A1* | 6/2020 | Iyengar | ............... H04L 12/2821 |
| 2021/0182111 A1* | 6/2021 | Jakobsson | ............... H04W 4/33 |

FOREIGN PATENT DOCUMENTS

WO  2020135490 A1  7/2020

OTHER PUBLICATIONS

"Build smarter mobile services and applications using IBM Cloud", Downloaded Feb. 15, 2021, 7 pages, <https://www.ibm.com/cloud/mobile>.
"IBM Watson products", Downloaded May 15, 2021, 14 pages, <https://www.ibm.com/watson/products-services>.

(Continued)

*Primary Examiner* — Normin Abedin
(74) *Attorney, Agent, or Firm* — Brian M. Restauro

(57) ABSTRACT

Embodiments of the present invention provide methods, computer program products, and systems. Embodiments of the present invention can dynamically determine whether a received command conflicts with a current environment setting. Embodiments of the present invention can, in response to determining that the impact of a received command conflicts with a current environment setting, determine one or more solutions that resolves the received command. Embodiments of the present invention can then execute at least one of the one or more determined solutions.

20 Claims, 4 Drawing Sheets

(56) References Cited

OTHER PUBLICATIONS

"Project Connected Home over IP" Downloaded Feb. 15, 2021, 12 pages, <https://www.connectedhomeip.com/>.
Cerf et al., "Project Connected Home over IP", Google Developers Blog, Dec. 18, 2019, 7 pages, <https://developers.googleblog.com/2019/12/project-connected-home-over>.
Chaki et al., "A Conflict Detection Framework for IoT Services in Multi-Resident Smart Homes", arXiv:2004.12702v1 [cs.CY] Apr. 27, 2020, 8 pages.
Resendes et al., "Conflict Detection and Resolution in Home and Building Automation Systems", Oct. 2013, 20 pages, <https://www.researchgate.net/profile/Paulo_Carreira/publication236658643_Conflict_Detection_and_Resolution_in_Home_and_Building_Automation_Systems/links/02e7e518bc9f81ad54000000.pdf>.

* cited by examiner

CONTEXTUAL DEVICE COMMAND RESOLUTION

BACKGROUND

The present invention relates in general to Internet of Things (IoT) devices and in particular to selecting a contextually appropriate device from a plurality of IoT devices.

Smart homes typically refer to solutions, products and services that provide users with the ability to use connected devices such as smart phones, smart watches, tablets, smart televisions, computers, etc., to remotely and locally control, manage and get notifications from connected devices such as security systems, lights, heaters, air conditioners, door locks and other appliances.

By using a smart home service, users can remotely change the security system mode of operation, turn connected devices (e.g., lights) on and off, change heater or air conditioner target temperature setting, get appliance excess energy usage notifications as text or email messages, get security system event notifications as text or email messages, set rules so that connected devices would change their state as a result of an event (e.g., time, date, other appliance state change), etc.

Typical smart home systems usually include a back end server system. The back end system typically communicates over the internet with a user's remote I/O interface terminal (whether mobile or stationary) and with a dedicated home controller which is the control point in the user's premises. The home controller communicates with the various connected devices, enabling the owner to control and get notifications from these devices. In addition, the home controller or the back end system may include a device scheduler in order to execute device related scheduled commands, set by the owner in advance or otherwise. The system may include smart devices such as laptops, tablets, smart televisions, smart phones, etc., which may be used as an I/O interface to the user.

In this typical architecture, any communication between smart devices and connected devices must pass via the home controller and the back end system. Events from connected devices are forwarded to the user's smart devices via the home controller and the back end system, and control commands sent from the user's smart devices are forwarded by the back end system to the home controller for execution.

SUMMARY

According to an aspect of the present invention, there is provided a computer-implemented method. The computer implemented method comprises dynamically determining whether a received command conflicts with a current environment setting; in response to determining that the impact of a received command conflicts with a current environment setting, determining one or more solutions that resolves the received command; and executing at least one of the one or more determined solutions.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that smart home technology presents a unique problem of having multiple devices and multiple communications protocols for respective devices. Specifically, embodiments of the present invention recognize the possibility of having more than one device that execute a user's command (e.g., volume adjustment, temperature control, light adjustment, query and answer retrieval, etc.). As such, embodiments of the present invention provide solutions for defining a unified connectivity protocol for such devices (e.g., Internet of Things (IoT) connected devices) to enable compatibility between respective devices. Embodiments of the present invention build on the unified connectivity protocols and provide additional functionality of resolving conflicting commands, that is, resolving commands issued by one user that changes the way a system (e.g., a smart home) operates that conflicts with a command issued by another user of the system (e.g., the smart home). Specifically, embodiments of the present invention analyze commands issue to devices connected to a network and perform a discord analysis to determine whether a given command presents a conflicting situation to a command issued by another user. Embodiments of the present invention can then generate and subsequently provide solutions to a conflicting command based, at least in part on a contextual analysis and historical conflict analysis. Some embodiments can automatically perform an ameliorative action that optimizes the system for users issuing conflicting commands as discussed in greater detail, later in this Specification.

Figure 1:
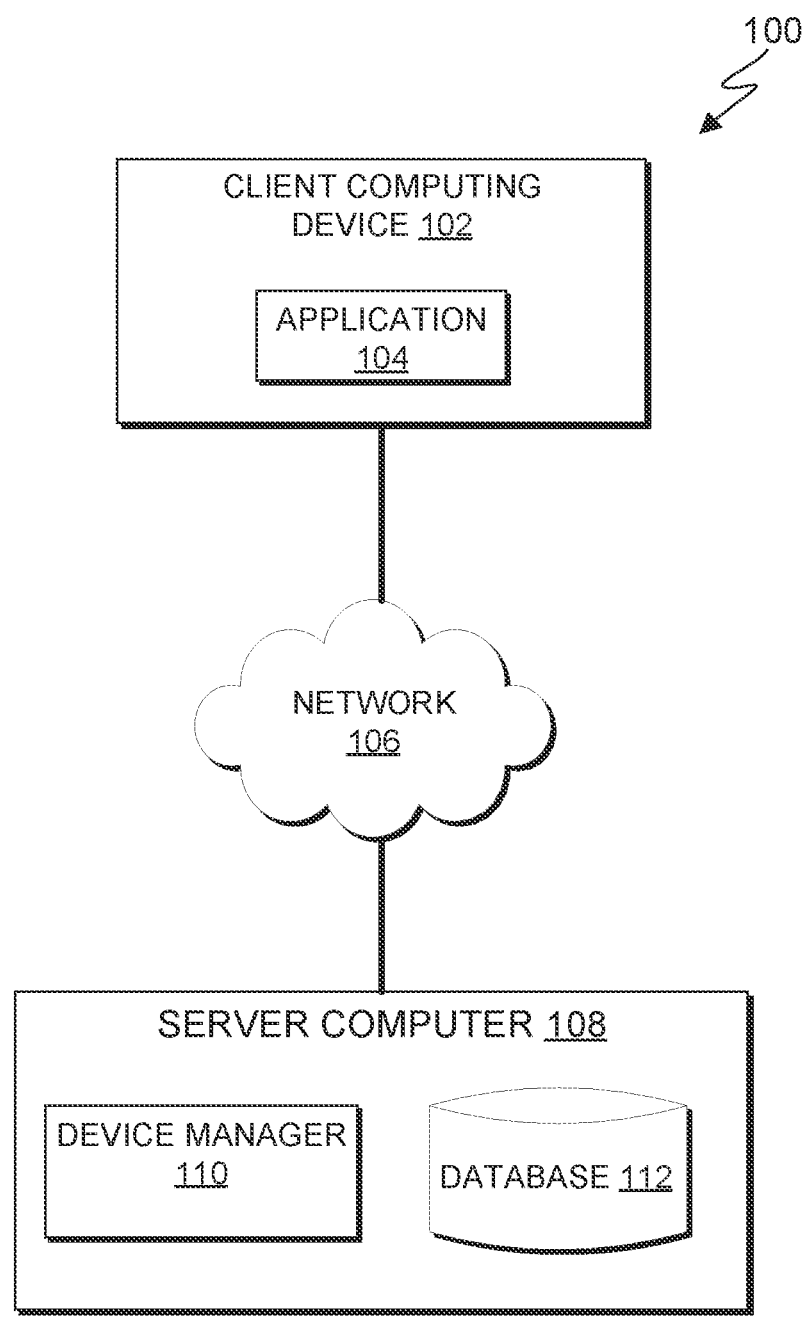
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access device manager 110 (e.g., using TCP/IP) to access content, user information, and database information. Application 104 can further communicate with device manager 110 to transmit instructions to detect and resolve conflicting commands in a smart home to avoid discord between a group of users by deriving impact analysis of implementing a user command, deriving conflict resolution, wherein the conflict resolution stems from an action that will impact at least one other user in the group of users (e.g., turning on a light in a dining room will impact visibility of users watching tv in the family room), and presenting resolution proposals to respective users on a contextually appropriate mobile device as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts device manager 110 and database 112. In this embodiment, device manager 110 resides on server computer 108. In other embodiments, device manager 110 can have an instance of the program (not shown) stored locally on client computer device 102. In other embodiments, device manager 110 can be a standalone program or system dynamically adjusts auditory levels within an environment such that a user can have optimal sound quality (i.e., clarity and same level of measured loudness) at a location where there the user is listening. In yet other embodiments, device manager 110 can be stored on any number or computing devices.

Device manager 110 detects and resolves conflicting commands in a smart home to avoid discord between a group of users for a given environment. In this embodiment, device manager 110 can resolve conflicting commands by dynamically determining an impact of a received command, determine an appropriate resolution, and subsequently execute the determined solution as discussed in greater detail with respect to FIGS. 2 and 3.

For example, user alpha has configured a cluster of smart devices to enable viewing of a movie in the family room having mood light (e.g., a first command). In this setting, lighting is darkened, TV picture profile is set to low luminance, and surround sound is set to three dimensional objects (adding height channels). In this example, device manager 110 can detect a conflicting second command (e.g., in the dining area of the house across from the family room a user issues a voice command on a separate device to turn on an overhead light). In this scenario, device manager 110 can determining that turning on the overhead light will directly impact the viewing experience in the family room. Embodiments of the present invention can generate solutions for the conflict the second command presents to the conflicting command based on a contextual analysis of current and historical settings. In this example, device manager 110 proposes and subsequently executes the solution of turning on the light at 45% brightness. In some embodiments, device manager 110 can present the user issuing the conflicting command with the proposed resolution. For example, rather than responding via voice which would disturb the movie scene, device manager 110 can transmit and subsequently display the proposed solution to user interface (e.g., to the user on their smart watch), where the user can accept the solution proposal An environment, as used herein, refers to a physical location in proximity of a user. For example, an environment can be a user's home and areas (i.e., locations or distinct rooms) of an environment. In most scenarios, an environment refers to an enclosed space (e.g., having one or more walls). An environment can include one or more smart devices that can be controlled by device manager 110. An environment can further include one or more objects such as one or more pieces of furniture, walls, floors, speakers, electronic devices, rungs, light fixtures, fans, kitchen appliances, windows, window treatments, etc. In certain circumstances, an environment can refer to a static area of the environment (e.g., a specific room of the house). In other circumstances, an environment can be dynamic. For example, an environment can refer to any location a user in and change dynamically as the user moves from one location to another (e.g., walking from the living room to the kitchen, up the staircase, and into the office).

In certain circumstances, device manager 110 can receive a layout of the environment and map one or more devices to distinct locations (i.e., rooms) of the environment. In other circumstances, device manager 110 can group one or more devices based on contextual use of those devices. For example, device manager 110 can group a smart tv, speaker system and lighting of a room (e.g., the living room) and attach a contextual situation to retrieve and display respective settings of the contextual situation. For example, where the contextual situation is viewing a movie, device manager 110 can retrieve setting configurations for specific ambient light, lighting of the tv and backlighting for the tv along with acoustic settings for the speaker system.

In some embodiments, device manager 110 can dynamically determine whether a received command interferes with current environment settings based on a likelihood of a detected command interfering or otherwise conflicting with one or more previous commands associated with a current environment setting. In this embodiment, device manager 110 can generate an impact score for a received command that indicates a likelihood that a received command would interfere or otherwise conflict with a previous user's command that results in current environment settings as discussed in greater detail with regard to FIG. 3.

For example, where a command calls for an increase in volume level of a speaker device, device manager 110 can reference a decibel table for known audible ranges of devices that can be found in an environment. Using a combination of artificial intelligence algorithms, device manager 110 can predict the likelihood of executing the command to increase volume will interfere with current environment settings for another user and take appropriate actions to adjust volume levels of the speaker receiving the command before the speaker produces the sound.

In some embodiments, device manager 110 can dynamically determine whether a received command conflicts with existing environment conditions based on a current contextual situation and in view of historical context. For example, device manager 110 can determine appropriate environment settings for certain types of activity like studying, sleeping, lounging, energy stimulating, etc. In these embodiments device manager 110 can also prioritize and determine whether a received command interferes with an existing setting (e.g., studying, where noise and light levels are specified to maximize user productivity) based on type of command (e.g., light or sound volume adjustments of surrounding rooms) and comparative priority of the command (e.g., the washer/dryer, kitchen appliance, ceiling fan, speakers, etc.).

In this embodiment, device manager 110 can then determine a resolution to resolve the conflicting command. For example, device manager 110 can manipulate one or more connected devices (e.g., volume adjustment of speakers in an adjacent room, luminosity levels of surrounding areas, etc.). In this embodiment, device manager 110 can use a combination of artificial intelligence and machine learning algorithms to determine an appropriate resolution as described in greater detail with respect to FIG. 2.

In certain circumstances, device manager 110 can prioritize conflicting commands based on user priority. For example, device manager 110 can provide a mechanism to have a tiered or otherwise group of users having respective privileges such that level one or alpha users (e.g., the owner such as parents) can have a greater priority over commands than level two or beta users (e.g., guests, children, etc.). In situations where a conflicting issue from a lower tiered user (e.g., level two or beta users) from an existing command from a higher tiered user (e.g., level one or alpha level users), device manager 110 can ignore the conflicting command. In some scenarios, device manager 110 can generate a proposed solution that minimizes interference for the higher tiered user. For example, a lower tier user can issue a command to turn on the lights of a room adjacent to the living room where a higher tier user has issued a command to trigger movie viewing settings, device manager 110 can recognize that turning on the lights would interfere with the viewing experience of the higher tier user, however, device manager 110 can determine that there would be minimal interference if the lights are turned on to 30% luminosity. In other embodiments, device manager 110 can optimize a resolution such that the solution minimizes interference for each of the users.

In instances where device manager 110 determines a resolution to be manipulation of one or more connected devices, device manager 110 can transmit instructions to modify volume, luminosity levels, on/off functionality of one or more respective devices. For example, where device manager 110 detects a conflicting command to turn on a speaker to play a song, device manager 110 can subsequently increase or decrease (i.e., reduce) the volume of source, enable volume boosting settings of a speaker system producing the sound, close or open door, and in some instances, transmit instructions to a connected device to remove obstacles producing the unwanted obstacle causing the audio. For example, in some embodiments device manager 110 can retract window treatments (e.g., window shades, blinds, curtains, etc.) to minimize light levels from outside the environment that would otherwise affect the viewing experience in the living room.

Database 112 stores received information and can be representative of one or more databases that give permissioned access to device manager 110 or publicly available databases. For example, database 112 can store environment information associated with the user as well as previous resolutions and contextual situations implemented prior. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
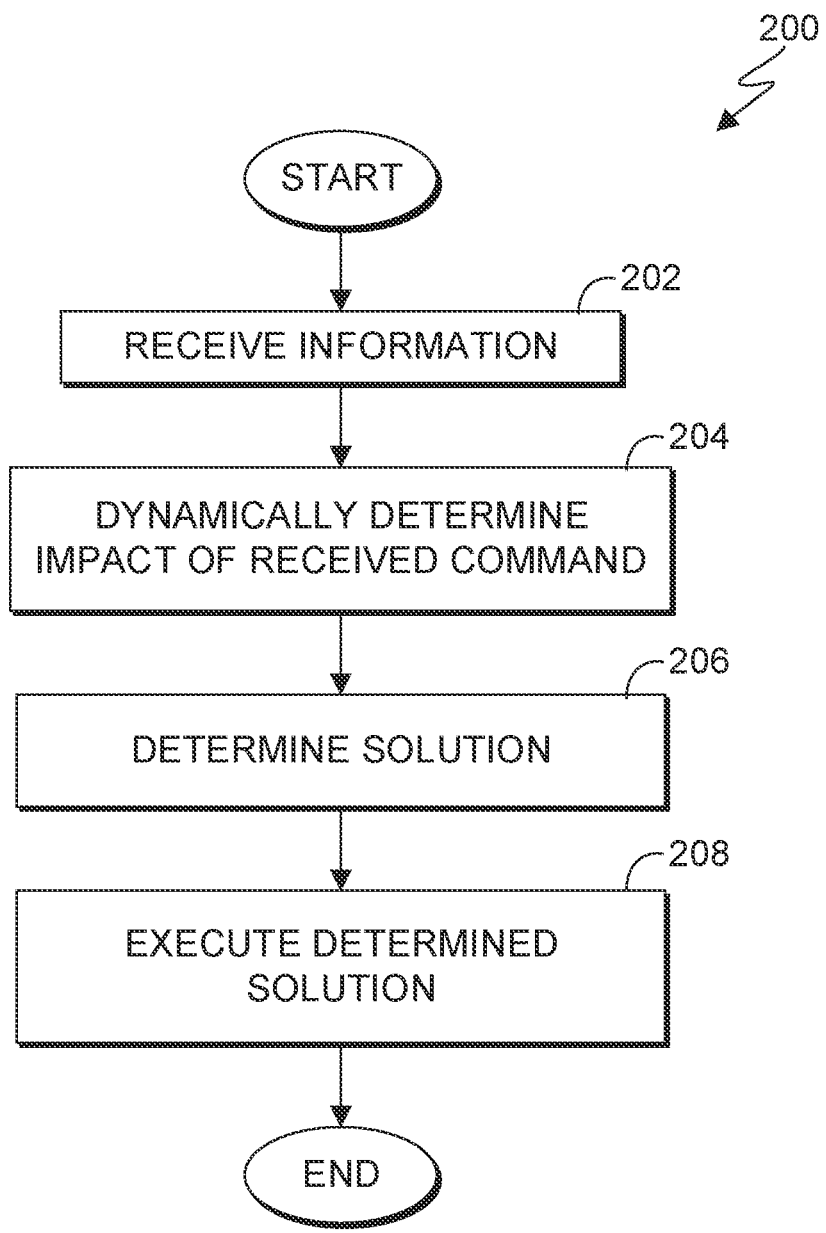
FIG. 2 is a flowchart depicting operational steps for dynamically resolving conflicting commands within an environment, in accordance with an embodiment of the present invention.

FIG. 2 is a flowchart 200 depicting operational steps for dynamically resolving conflicting commands within an environment, in accordance with an embodiment of the present invention;

In step 202, device manager 110 receives information. In this embodiment, device manager 110 receives a request from client computing device 102. In other embodiments, device manager 110 can receive information from one or more other components of computing environment 100.

Information received by device manager 110 refers to a received command. For example, device manager 110 can receive a user command related to a smart home device or a grouped scene of smart home devices. A command as used herein is a request for one or more connected devices to execute one or more actions to accomplish a task. A command can include a voice command issued to a digital assistant, a command issued via a device specific app, or a multi-device management app (such as a home automation system), a command issued directly on a device itself (e.g., turning on a light switch).

Information can also include information pertaining to an area (i.e., location) within an environment and respectively associated status of devices within an area. For example, device manager 110 can receive information from one or more connected IoT devices (e.g., smart speakers, sound systems, television, home automation devices, wireless devices, Bluetooth connected devices, electronic devices, etc.). In some embodiments, device manager 110 can receive information comprising environmental layouts (e.g., blueprints of a home). In some embodiments, environmental layouts can include one or more objects (e.g., connected IoT devices, electric or gas fireplaces, kitchen and laundry appliances, etc.) and placement of each of the one or more objects in respective areas (e.g., rooms of the home), operational status of each device (is the device on or off), defined settings for each device (e.g., what is the device doing), and participation of a device in a larger scene of devices (e.g., that the speakers are supporting a movie scene together with a TV device, lighting device, and curtain closing device). Device manager 110 can also retrieve the status of any imminently scheduled smart devices within the vicinity of the smart home device or smart home grouped scene. In this manner device manager 110 can consider devices not yet operational but are scheduled to become operational within a defined period.

Information can also include one or more room profiles, settings of grouped devices, and contextual device settings. For example, a room profile can include placement of one or more connected devices within an area (i.e., room) and contextual device settings of respectively connected devices. As used herein contextual device settings refers to one or more specified uses for an area. For example, a use can be a viewing mode, relaxation mode, high energy mode, etc. Specifically, where a room (e.g., living room) contains a smart tv, smart lights, and a connected speaker system, a room profile could contain a contextual device setting for viewing a movie, for entertaining guests, etc. In instances where the contextual device setting is identified for viewing a movie, the room profile can specify that surround sound be activated and luminosity levels for overhead lighting be turned off and the backlighting for the viewing screen (e.g., tv) be set to 30%.

In circumstances where environment layouts are not known, device manager 110 can transmit a request to IoT connected devices within an area to send and register respective UUIDs. For example, device manager 110 can request IoT devices (e.g., smart phones, speaker systems, smart televisions, connected appliances, smart lights, etc.) to connect the devices. In this embodiment, device manager 110 can collect additional information from one or more other services by invoking an in-bound API which then initiates a MAC based trajectory path request for all the devices in the area. In this embodiment, an in-bound approach of communication includes control framed of MAC (Media Access Control) protocol and device manager 110 invokes an in-bound API across the common external data collector service in 5G domain wherein the static platform data can be accessed. In this way, device manager 110 can collect static data that includes platform identification, hardware specification and model internal architecture is collected from the MAC based service interconnect manager. Examples of static data can include hardware default settings. Device manager 110 can then parse the collected information using a regex-based document classifier and saved in a metadata mapper.

In step 204, device manager 110 dynamically determines an impact of a received command. In this embodiment, device manager 110 dynamically determines an impact of a received command for a respective room based on received information using a combination of machine learning and artificial intelligence algorithms. For example, device manager 110 can determine an impact of a received command for a respective room based on a user's location within an area (room) of the environment and based on how execution of the conflicting command impacts the current environment. In doing so, device manager 110 can generate an impact score for the received command, and subsequently determine whether the received command, when executed, interferes with current environment settings as discussed in greater detail with regard to FIG. 3. Specifically, device manager 110 can generate an impact score that indicates a threshold level of interference that corresponds to a likelihood that a command is capable of interfering with an existing device configuration (i.e., current environment settings) that resulted from a previous command similarly discussed with respect to FIG. 3.

In this embodiment, device manager 110 can improve and refine its calculations for interference based on historical learning. In some embodiments, device manager 110 can dynamically create a rule for certain circumstances. For example, device manager 110 can identify that at a certain time, with respect to two rooms, the living room and the kitchen, different occupants of the house tend to produce and require different room profile.

In instances where no rules have been made, device manager 110 can be pre-loaded with a set of default rules.

Upon a first use of device manager 110, device manager 110 can be configured to have a baseline set of rules that can be modified over time using a combination of machine learning and prediction algorithms or by manual input of the user.

In step 206, device manager 110 determines a resolution for the conflicting command, that is, a command that has been determined to conflict with a prior command. In this embodiment, device manager 110 can use a combination of artificial intelligence and machine learning algorithms to determine an appropriate resolution.

For example, device manager 110 can utilize the impact assessment score indicating the user command will conflict with existing IoT device or scene operation to determine potential changes that can be made to remove the conflict. Specifically, device manager 110 can analyze floor plans and physical characteristics of the surroundings to determine if lowering a combination of devices or various aspects of a singular device may resolve the resolution. For example, device manager 110 can generate simulations for certain solutions to confirm that a proposed solution will work (e.g., will lowering the light by 10% result in reduced reflectivity on a screen 20 ft away?).

In certain embodiments, device manager 110 can consider alternative operations. For example, if playing a smart speaker will result in unwanted noise pollution nearby, device manager 110 can recommend that the audio be sent from the smart speaker via Bluetooth to a set of connected headphones.

In certain embodiments, device manager 110 can further utilize historical analysis. For example, device manager 110 can reference a conflict resolution repository that includes conflicting command resolution implemented manually by a user (e.g., the last time this conflict came up, what did the users do to manually resolve this conflict?), and conflicting command resolution previously performed by the system— if the system previously recommended a proposed solution, the repository records what that solution was and how well it was received by the users.

In other embodiments, device manager 110 can generate a resolution score for each possible solution. In this embodiment, device manager 110 selects the highest scoring conflict resolution. For example, in this embodiment, a numeric scale is used where lesser numbers indicate a lower ranking while greater numbers indicate a higher ranking, that is a score of one would be a lower resolution score than a score of fifty.

In step 208, device manager 110 executes the determined solution. In this embodiment, device manager 110 executes the determined solution by transmitting instructions to respective controllers of IoT devices that have received a conflicting command and modify volume, luminosity levels, on/off functionality of one or more respective devices. For example, where device manager 110 detects a conflicting command to turn on a speaker to play a song. Device manager 110 can subsequently increase or decrease (i.e., reduce) the volume of source, enable volume boosting settings of a speaker system producing the sound.

In some embodiments, device manager 110 can transmit the determined solution to the user issuing the command only if that respective user device (or devices) will be impacted. In other embodiments, device manager 110 can transmit a notification that includes the determined solution to both the user issuing the command and any users who issued prior commands to IoT devices that are currently active and will be impacted by the determined solution. Optionally, device manager 110 can provide a mechanism for a user to manually override the determined solution with an alternate solution. Device manager 110 can then store the alternate solution and map that alternate solution to the specific contextual situation.

In this embodiment, device manager 110 sends the determined solution notification to each smart device in a manner that gain's the user's attention. Device manager 110 can function according to user preferences. In some embodiments, device manager 110 can transmit the notification by selecting a device the user is currently using. For example, device manager 110 can send the notification to a user's smart phone if they are currently using their smart phone. In other embodiments, device manager 110 can use a combination of machine learning and artificial intelligence algorithms to select a device that gain's the user's attention. For example, device manager 110 can assign weighted values for each of the devices the user has and select the device that has the highest score. For example, if the user has a smart watch and a smart phone but device manager 110 detects that the user is not using the smart phone, device manager 110 can select the user's smart watch as the device to transmit the notification to. In other embodiments, device manager 110 can select a user device to transmit notifications to in a manner that minimizes interruption. For example, if one user has a movie scene enabled, a non-audible notification should be sent (e.g., the user's smart watch).

In this embodiment device manager 110 can record the response from one or all parties with regard to the determined solution proposal. For example, in some embodiments, device manager 110 can implement the determined solution only if all the users agree. In other embodiments, only a primary or alpha level users (i.e., the highest tiered user) approves. In situations where the determined solution is not accepted by all users, device manager 110 can suggest additional solutions to the users. Regardless of the actions taken, device manager 110 records any action taken (e.g., both the acceptance, rejection of the proposed solution, and any further manual intervention) into a historical database.

Figure 3:
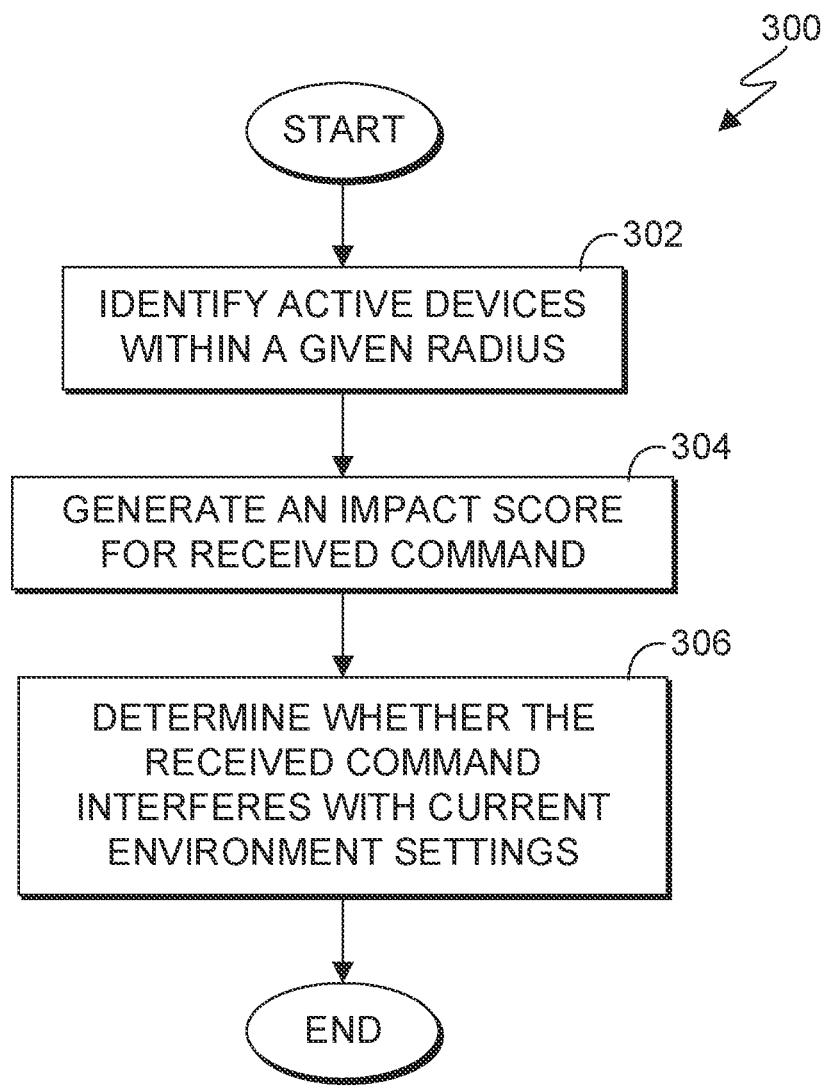
FIG. 3 is a flowchart for determining an impact score for a received command, in accordance with an embodiment of the present invention.

FIG. 3 is a flowchart 300 for determining an impact score for a received command, in accordance with an embodiment of the present invention.

In step 302, device manager 110 identifies active devices within a given radius of the environment. In this embodiment device manager identifies active devices within a given radius of the environment by transmitting a request IoT devices (e.g., smart phones, speaker systems, smart televisions, connected appliances, smart lights, etc.) to connect the devices. In this embodiment, device manager 110 can collect additional information from one or more other services by invoking an in-bound API which then initiates a MAC based trajectory path request for all the devices in the area. In this manner, device manager 110 can identify current environment settings including existing commands that led to the current environment settings, device configurations, and existing users that are active for a given area.

In step 304, device manager 110 generates an impact score for a received command. For example, device manager 110 can assign weight values to received information to generate an impact score. In this embodiment, an impact score indicates a threshold level of interference that indicates a likelihood that an object capable of producing or otherwise emitting sound will interfere with a listening experience of a user. For example, in this embodiment, device manager 110 uses a numeric scale where greater numbers indicate a higher risk while lower numbers indicate a lesser risk. Specifically, in this embodiment, where the scale is from zero to one hundred, a risk score of ninety indicates a higher risk than a risk score of ten.

In this embodiment, device manager 110 has three different threshold values for impact. For example, minimal risk category denotes a command is permissible (e.g., a risk score of ten or under in a numeric scale ranging from zero to one hundred) and that the command should be executed. Conversely, a high risk score denotes impact is likely to occur (e.g., a risk score of ninety and above) and a resolution should be proposed to resolve the conflicting command (e.g., appropriate action needs to be taken). Scores above ten and below ninety indicate a medium risk (e.g., a notification to the user will be generated and appropriate action will be taken based on user preference). In scenarios where a medium risk is determined, device manager 110 can generate a notification to the user and receive manual input from the user to determine what action to take. In other embodiments, the impact threshold can be configured to any desired threshold. In general, device manager 110 can automatically take appropriate action when a received command meets or exceeds the interference threshold for high risk.

In other embodiments, device manager 110 can derive a device impact analysis score that determines the influence (i.e., impact) on the environment implementing the command will have. In certain embodiments, device manager 110 can have an impact assessment module analysis that has access to known physical characteristics about the environment (e.g., layout, materials used that include sound deadening material, flooring used, quartz, marble, other acoustic properties, etc.) and the device capabilities. For example, device manager 110 can use an approximation on luminance of turning on a given light to the surrounding area such a reflectivity on nearby screens, and light pollution in other locations in its conflict resolution proposal (e.g., determined solution to a conflicting command). In another example, device manager 110 can calculate the potential impact based on an approximation on luminance of turning on a given light to the surrounding area such a reflectivity on nearby screens, and light pollution in other locations. Device manager 110 can also utilize acoustic qualities in the environment (e.g., turning on a speaker at 35% volume compared to the ambient noise in the vicinity and whether the speaker will the noise drown out other activities in a quiet house, or have minimal impact).

In other embodiments, device manager 110 can receive user information that specifies threshold levels of interference. For example, a user can specify a contextual situation, types of sound, and create a rule that can be executed by device manager 110 when those conditions (i.e., contextual situations) are met.

In instances where there are multiple users, each having respective room profiles containing device configurations and groupings of devices that may cause interference with one another. For example, user alpha is watching a movie in the living room and user beta walks into the abject dining room and issues a command to turn on the lights. In this example, user alpha is watching a movie and user beta creates a conflicting command by turning on lights which would affect user alpha's viewing experience. Device manager 110 can generate a impact resolution that minimizes interference for both of the users. In certain embodiments, device manager 110 can transmit a notification to each of the user and allow for manual input. In other embodiments, device manager 110 can prioritize users based on a user's priority status (e.g., a parent or owner of the system as opposed to a child or guest).

In step 306, device manager 110 determines whether the received command interferes with current environment settings. In this embodiment device manager 110 determines that the received command interferes with current environment settings, that is, conflicts with an existing command that resulted in the current environment settings, by determining whether the impact threshold is met or exceeded. For example, device manager 110 can compare the generated impact score to the impact threshold score. In response to the impact threshold score being reached or exceeded, device manager 110 determines that the received command conflicts with an existing command. Conversely, device manager 110 determines that the received command does not conflict with an existing command when the impact score does not reach or exceed the impact threshold.

Figure 4:
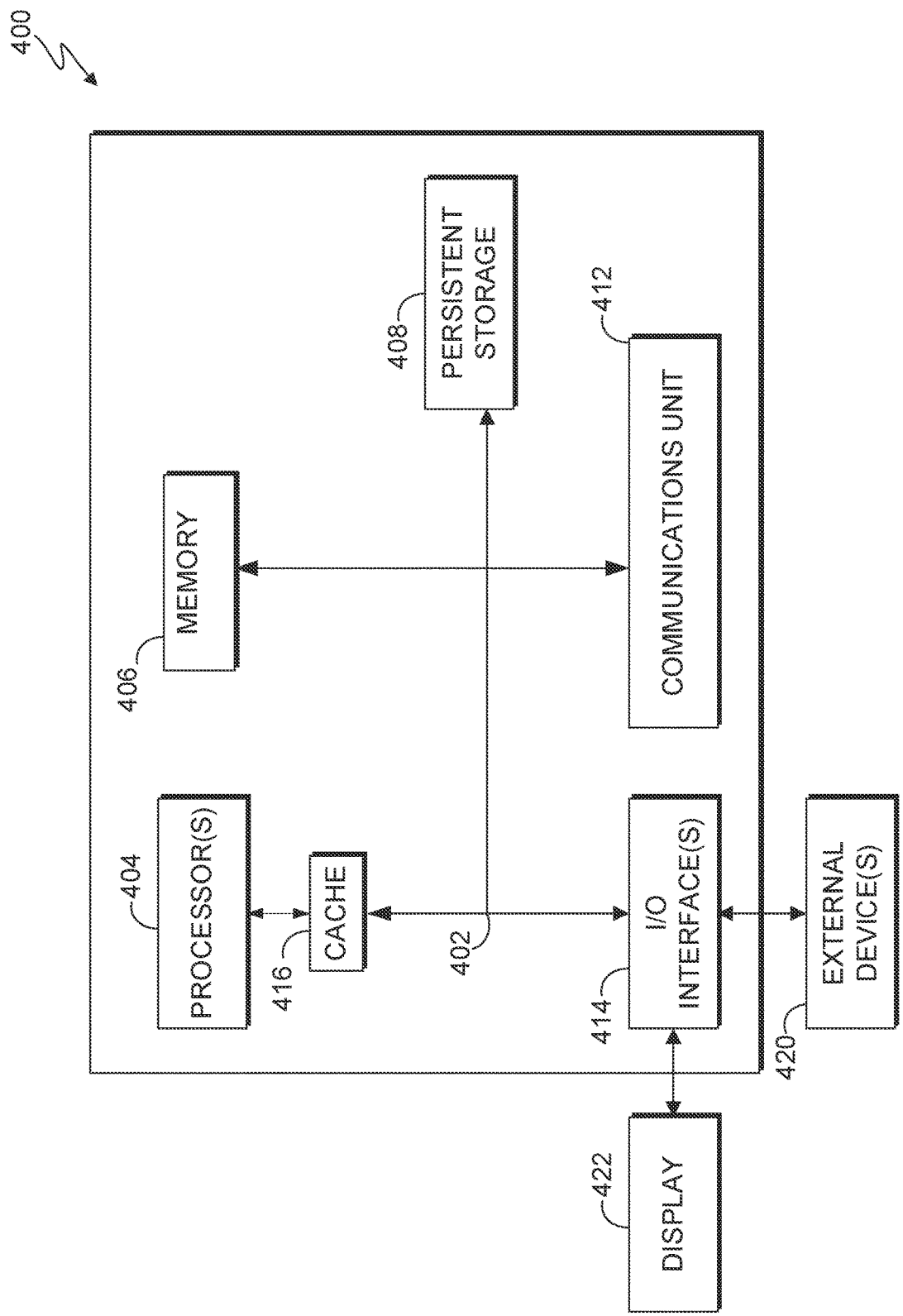
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Device manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Device manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., device manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising: dynamically determining whether a received command conflicts with a current environment setting; in response to determining that the impact of a received command conflicts with a current environment setting, determining one or more solutions that harmonizes the received command with the current environment setting based on an impact score of the received command, wherein the determined one or more solutions, adjust respective settings for adjacent rooms that are affected by the received command that conflicts with the current environment setting; and executing at least one of the one or more determined solutions.

2. The computer-implemented method of claim 1, wherein dynamically determining whether a received command conflicts with a current environment setting comprises:
   generating an impact score for the received command; and
   in response generated impact score for the received command meets an impact threshold, determining that the received command conflicts with the current environment setting.

3. The computer-implemented method of claim 2, wherein generating an impact score for the received command comprises:
   analyzing floor plans of the current environment, physical characteristics of the current environment, and devices and capabilities of the devices within the current environment.

4. The computer-implemented method of claim 3, further comprising:
   determining how execution of the conflicting command impacts the current environment.

5. The computer-implemented method of claim 1, wherein determining one or more solutions that resolves the received command comprises:
   determining whether adjusting a combination of devices or adjusting various aspects of a single device can minimize the impact of the received command that conflicts with the current environment settings.

6. The computer-implemented method of claim 5, further comprising:
resolving a conflicting command based on respective user's priority.

7. The computer-implemented method of claim 1, further comprising:
transmitting at least one determined solution of the one or more determined solutions to the user issuing the conflicting command and another user that will be impacted by execution of the conflicting command.

8. A computer program product comprising:
one or more computer readable storage media and program instructions stored on the one or more computer readable storage media, the program instructions comprising:
program instructions to dynamically determine whether a received command conflicts with a current environment setting;
program instructions to, in response to determining that the impact of a received command conflicts with a current environment setting, determine one or more solutions that harmonizes the received command with the current environment setting based on an impact score of the received command, wherein the determined one or more solutions, adjust respective settings for adjacent rooms that are affected by the received command that conflicts with the current environment setting; and
program instructions to execute at least one of the one or more determined solutions.

9. The computer program product of claim 8, wherein the program instructions to dynamically determine whether a received command conflicts with a current environment setting comprise:
program instructions to generating an impact score for the received command; and
program instructions to, in response generated impact score for the received command meets an impact threshold, determine that the received command conflicts with the current environment setting.

10. The computer program product of claim 9, wherein the program instructions to generate an impact score for the received command comprise:
program instructions to analyze floor plans of the current environment, physical characteristics of the current environment, and devices and capabilities of the devices within the current environment.

11. The computer program product of claim 10, wherein the program instructions stored on the one or more computer readable storage media further comprise:
program instructions to determine how execution of the conflicting command impacts the current environment.

12. The computer program product of claim 8, wherein the program instructions to determine one or more solutions that resolves the received command comprise:
program instructions to determine whether adjusting a combination of devices or adjusting various aspects of a single device can minimize the impact of the received command that conflicts with the current environment settings.

13. The computer program product of claim 12, wherein the program instructions stored on the one or more computer readable storage media further comprise:
program instructions to resolve a conflicting command based on respective user's priority.

14. The computer program product of claim 8, wherein the program instructions stored on the one or more computer readable storage media further comprise:
program instructions to transmit at least one determined solution of the one or more determined solutions to the user issuing the conflicting command and another user that will be impacted by execution of the conflicting command.

15. A computer system comprising:
one or more computer processors;
one or more computer readable storage media; and
program instructions stored on the one or more computer readable storage media for execution by at least one of the one or more computer processors, the program instructions comprising:
program instructions to dynamically determine whether a received command conflicts with a current environment setting;
program instructions to, in response to determining that the impact of a received command conflicts with a current environment setting, determine one or more solutions that harmonizes the received command with the current environment setting based on an impact score of the received command, wherein the determined one or more solutions, adjust respective settings for adjacent rooms that are affected by the received command that conflicts with the current environment setting; and
program instructions to execute at least one of the one or more determined solutions.

16. The computer system of claim 15, wherein the program instructions to dynamically determine whether a received command conflicts with a current environment setting comprise:
program instructions to generating an impact score for the received command; and
program instructions to, in response generated impact score for the received command meets an impact threshold, determine that the received command conflicts with the current environment setting.

17. The computer system of claim 16, wherein the program instructions to generate an impact score for the received command comprise:
program instructions to analyze floor plans of the current environment, physical characteristics of the current environment, and devices and capabilities of the devices within the current environment.

18. The computer system of claim 17, wherein the program instructions stored on the one or more computer readable storage media further comprise:
program instructions to determine how execution of the conflicting command impacts the current environment.

19. The computer system of claim 15, wherein the program instructions to determine one or more solutions that resolves the received command comprise:
program instructions to determine whether adjusting a combination of devices or adjusting various aspects of a single device can minimize the impact of the received command that conflicts with the current environment settings.

20. The computer system of claim 19, wherein the program instructions stored on the one or more computer readable storage media further comprise:
program instructions to resolve a conflicting command based on respective user's priority.

* * * * *